US010719851B2

(12) United States Patent
Lenhart et al.

(10) Patent No.: US 10,719,851 B2
(45) Date of Patent: Jul. 21, 2020

(54) SYSTEM AND METHOD FOR CREATING DYNAMIC ADVERTISEMENTS (71) Applicant: American Express Travel Related Services Company, Inc., New York, NY (US)

(72) Inventors: Brian G. Lenhart, Berkeley Heights, NJ (US); Laura Wolf, Fair Haven, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 800 days.

(21) Appl. No.: 14/871,537

(22) Filed: Sep. 30, 2015

(65) Prior Publication Data
US 2017/0091817 A1    Mar. 30, 2017

(51) Int. Cl.
G06Q 30/00 (2012.01)
G06Q 30/02 (2012.01)

(52) U.S. Cl.
CPC ..... G06Q 30/0255 (2013.01); G06Q 30/0252 (2013.01); G06Q 30/0254 (2013.01); G06Q 30/0256 (2013.01); G06Q 30/0261 (2013.01); G06Q 30/0269 (2013.01)

(58) Field of Classification Search
CPC .................................. G06Q 30/0207–30/0277
See application file for complete search history.

(56) References Cited

U.S. PATENT DOCUMENTS

| 8,660,894 B2* | 2/2014 | O'Sullivan | G01C 21/3484 705/14.4 |
| 2009/0265460 A1* | 10/2009 | Balasubramanian | H04L 12/2602 709/224 |
| 2010/0094878 A1* | 4/2010 | Soroca | G06Q 30/0267 707/748 |
| 2011/0029364 A1 | 2/2011 | Roeding et al. | |
| 2013/0046631 A1* | 2/2013 | Grigg | G06Q 30/0207 705/14.58 |
| 2013/0074347 A1 | 3/2013 | Heath | |
| 2013/0198016 A1 | 8/2013 | Ter-Saakov | |
| 2014/0156394 A1 | 6/2014 | Argue et al. | |

(Continued)

FOREIGN PATENT DOCUMENTS

JP    2012529085    11/2012

OTHER PUBLICATIONS

International Preliminary Report on Patentability dated Sep. 13, 2017 in Application No. PCT/US2016/047322.

(Continued)

*Primary Examiner* — Michael Bekerman
(74) *Attorney, Agent, or Firm* — Thomas Horstemeyer, LLP (57) ABSTRACT

A transaction account provider may obtain transaction information from consumer transactions and information from a consumer browsing a transaction account provider website, collectively first-party data. A web server may obtain second-party data from a consumer's use of a merchant website. Additional third-party data may be purchased from a third-party data source. An ad server may use the first-party data, the second-party data, and the third-party data to select a relevant personalized banner ad to be displayed to the consumer.

20 Claims, 2 Drawing Sheets

(56) References Cited

U.S. PATENT DOCUMENTS

| | | | | |
|---|---|---|---|---|
| 2015/0051979 A1* | 2/2015 | Knab | ................ | G06Q 30/0269 |
| | | | | 705/14.66 |
| 2015/0081435 A1 | 3/2015 | Griffiths | | |
| 2015/0235246 A1* | 8/2015 | Benis | ................ | G06Q 30/0256 |
| | | | | 705/7.33 |
| 2015/0236925 A1* | 8/2015 | Bodz | ................ | G06Q 30/0255 |
| | | | | 709/203 |
| 2016/0321691 A1* | 11/2016 | Bott | ................ | G06Q 30/0255 |

OTHER PUBLICATIONS

International Search Report and Written Opinion dated Oct. 28, 2016 in Application No. PCT/US2016/047322.
Non-final office action dated Feb. 1, 2019 in Canadian Application No. 3,000,653.
Japanese Office Action dated Aug. 1, 2019 in JP Application 2018-516434.
Australia Office Action dated Jun. 3, 2019 in AU Application 2016331733.
Examination Report dated Mar. 6, 2019 in AU Serial No. 2016331733.
European Search Report dated Apr. 23, 2019 in EP Serial No. 16852249.8.

* cited by examiner

SYSTEM AND METHOD FOR CREATING DYNAMIC ADVERTISEMENTS

FIELD

The present disclosure relates to combining data from multiple sources to create personalized banner ads.

BACKGROUND

In the online world, consumer buying patterns and browsing patterns may be mined while the consumer is using a web browser or shopping online. A great deal of resources are used to identify advertisements and offers best suited to a particular consumer. However, it is difficult to present offers which are specifically tailored to consumers without sufficient information. Multiple parties may have information relevant to a consumer; however, it can be difficult to effectively combine the data from multiple parties in order to present personalized advertisements.

SUMMARY

A system, method, and computer readable medium (collectively, the "system") is disclosed for providing personalized banner ads. A tracking pixel may be transmitted to a consumer device. Tracking data may be received from the tracking pixel. The tracking data may be combined with transaction account data. The tracking data and the transaction account data may be transmitted to an ad server. Third-party data may be purchased from a third-party data source. The ad server may receive second-party data from a web server. The ad server may match the tracking data, the transaction account data, the third-party data and the second-party data in a unique cookie. The ad server may select a personalized banner ad based on the unique cookie. The ad server may transmit the personalized banner ad to the consumer device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
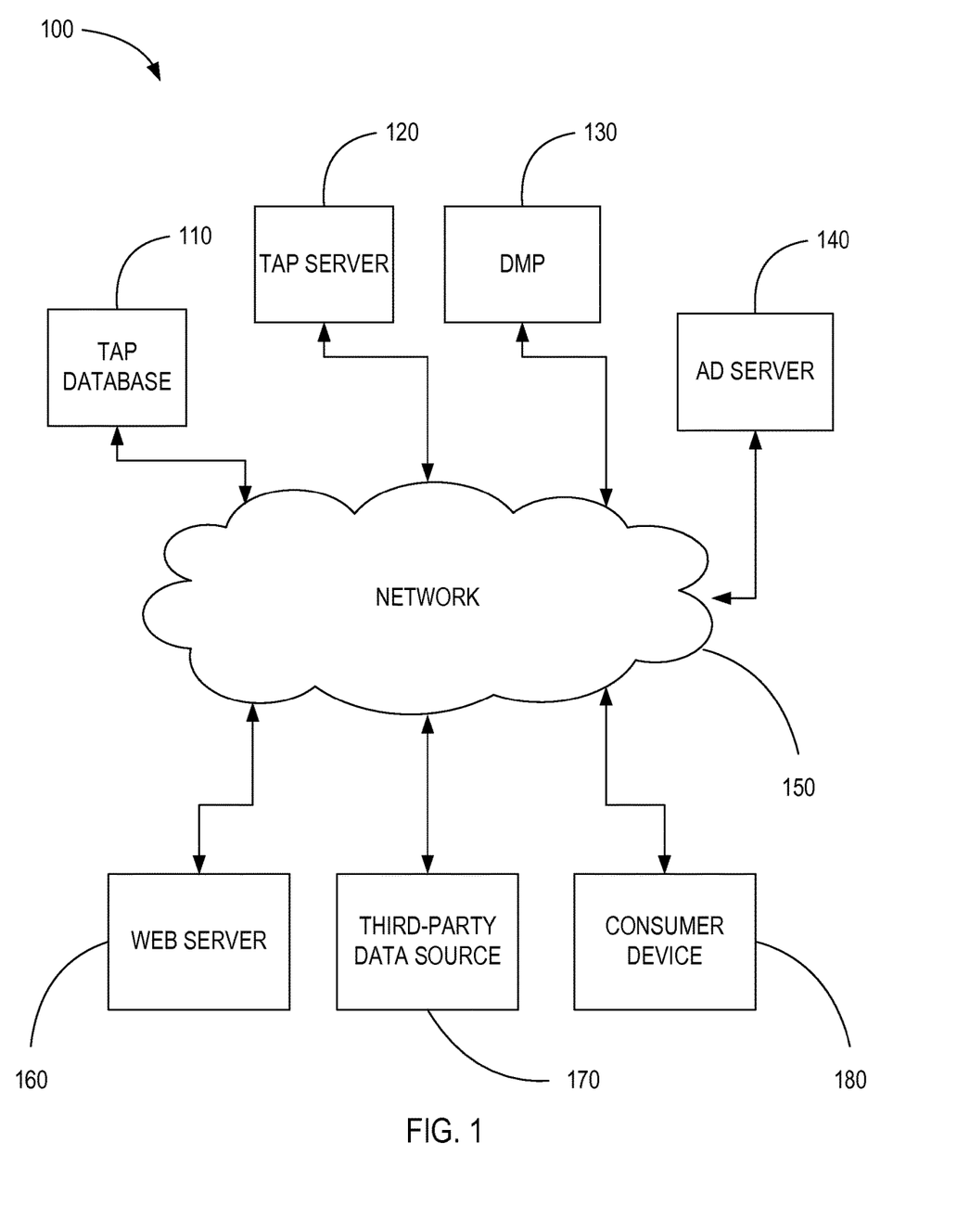
FIG. 1 illustrates an exemplary system for delivering personalized banner ads, in accordance with various embodiments.

In various embodiments, and with reference to FIG. 1, a system 100 configured for combining data from multiple data sources and delivering personalized banner ads is illustrated according to various embodiments. The personalized banner ads may be targeted, customized, dynamic, rotating, periodic, random, updated, based on an algorithm, incremented and/or refreshable. The system and method may expedite processing (e.g., by having access to relevant information), reduce the need for excessive advertisements (e.g., by personalizing more effective banner ads), and overcome technical barriers to combining information from multiple sources which may allow for personally tailored advertisements to be transmitted to consumers.

The system may comprise a transaction account provider ("TAP") database 110. The TAP database 110 may store data related to a consumer's transactions (e.g., purchase of items, etc) using a transaction account issued by the transaction account provider. The data may comprise amounts of transactions and information about the transactions. For example, the data may indicate that a consumer purchased a flight to a particular city on a particular date. The TAP database 110 may further comprise demographic data about the consumer, such as income, geographic location, average spend, transaction account status, etc. Consumer data stored in the TAP database 110 is referred to herein as offline data.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

In various embodiments, the system 100 may further comprise a TAP server 120. The TAP server 120 may comprise one or more computer systems in communication with the TAP database 110 over a network 150. The TAP server 120 may be maintained, for example, by a financial institution and/or transaction account provider. The TAP server 120 may send demographic information and transaction information collected during sales through the network 150 to a data management platform 130.

In various embodiments, a transaction may comprise a record of charge (or "ROC") comprising transaction data. The ROC may include a unique identifier associated with a transaction. A transaction may, in various embodiments, be performed by one or more consumers using a transaction account, such as a transaction account associated with a gift card, a debit card, a credit card, and the like. A ROC may contain details such as travel information, location, merchant name or identifier, transaction amount, transaction date, account number, account security pin or code, account expiry date, and the like for the transaction. The TAP server 120 may obtain typical ROC data that is sent with each authorization/transaction, and the ROC data may be stored in the TAP database 110.

In various embodiments, the ROC may include travel data. For example, the consumer may purchase a flight, and the ROC may include a departure time, date, and/or destination. Similarly, the ROC may include a return time, date, and/or destination.

In various embodiments, each individual transaction record may be transmitted to the TAP server 120, in response to the consumer completing a transaction that generates an individual transaction record. The data may also be obtained in batch, periodically, at certain times, etc. The TAP server 120 may store and/or use each individual transaction record in response to receiving the individual transaction records. The TAP server 120 may also store and/or use consumer information that was obtained prior to or contemporaneously with individual transaction records. The consumer information may include internal data, external data, data obtained from any channel, etc. The TAP server 120 may store individual transaction records and consumer information in the TAP database 110, for example. Transaction information may comprise consumer information. The consumer may provide consumer information (e.g., merchants of interest, gender, age, or other information for use in projecting future purchases by the consumer). The transaction information for the consumer may be captured by the TAP server 120 in the course of transactions made by the consumer.

Without the connection between the TAP server 120 and the TAP database 110, other entities may not be able to obtain the internal data or ROC data without partnering with additional parties, which would require additional cookies in order to match data.

In various embodiments, the TAP server 120 may be hosted, for example, by a transaction account provider. Phrases and terms similar to "transaction account" may include any account that may be used to facilitate a financial transaction. Phrases and terms similar to "financial institution" or "transaction account provider" may be used interchangeably and include any entity that offers transaction account services (e.g., payment processor). Although often referred to as a "financial institution," the financial institution may represent any type of bank, lender or other type of account issuing institution, such as credit card companies, card sponsoring companies, or third-party issuers under contract with financial institutions. It is further noted that other participants may be involved in some phases of the transaction, such as an intermediary settlement institution.

The TAP server 120 may track a consumer's interaction with a TAP website using a tracking pixel. The tracking pixel may comprise code inserted into a custom or third-party creative that makes a server call and returns a transparent 1×1 image, such as a GIF file. The tracking pixel may be transmitted to a consumer device. The TAP server 120 may store the information from the tracking pixel in an online cookie. A cookie is a text file that stores information about the user's online behavior.

The TAP server 120 may transmit the offline data and the information from a tracking pixel to the data management platform 130. The offline data and the information from the tracking pixel may collectively be referred to as first-party data. The data management platform 130 may match the offline data for a consumer with the data in the online cookie.

The system 100 may comprise a server to server integration between the data management platform 130 and an ad server 140. The server to server integration allows offline consumer data and data from the online cookie to be transmitted to the ad server 140. An example of an ad server is FLASHTALKING™, which is a trademark of Simplicity Marketing, LTD. The server to server integration provides a direct linkage of data or information between the two servers, which is quicker and more efficient than other systems which may be reliant on a pixel to transmit data. The pixel would be an extra step in the process that would require matching of data and would be slower and less effective. In contrast, the server to server integration does not rely on an intermediary step to transmit data. The server to server integration may link two different technology systems, one which houses data and one which receives data.

The ad server 140 further comprises an ad server cookie. The ad server cookie may store information about a consumer's web browsing history. For example, the ad server cookie may store information regarding what websites a consumer has visited and which links a consumer has clicked.

The system 100 may further comprise a third-party data source 170. The third-party data source may comprise any combination of hardware and/or software which stores online data. The third-party data source may be operated by an entity which sells third-party data. The third-party data may comprise information such as keyword targeting, weather data, geographic data, and consumer patterns. The third-party may receive payment for the third-party data, and the third-party data source 170 may transmit the third-party data to the ad server 140.

The system 100 may comprise a web server 160. The web server 160 may be operated by, or affiliated with a merchant. The web server 160 may provide a consumer access to a website, such as a merchant website, a news website, or any other type of website or application which a consumer may access over a network. The web server 160 may present a website which allows dynamic advertisements such as banner ads to be displayed on a consumer device. The web server 160 may maintain a web cookie which stores information regarding the consumers interaction with the web server 160.

The ad server 140 may set up dynamic creative campaigns. The ad server 140 may match or associate advertising content (e.g., dynamic content) to information from the data management platform 130, the third-party data source 170, and the web server 160. The ad server 140 may perform the matching based on a variety of factors, such as the type of cardmember, the content being currently viewed on a webpage, the content previously viewed on a webpage, keywords entered by a consumer, tags present in webpages, demographic information, ROC data, etc. For example, if a user searched for "family vacation," and ROC data indicated that the user had completed a transaction involving surfing, the ad server 140 may select an advertisement related to surfing vacations. The ad server 140 may select and transmit banner ads to the consumer. The banner ads may be partially or fully personalized to the consumer. For example, the banner ads may be personalized based on travel destination information, travel dates, hotel offers for the travel dates, consumer spend capability, consumer preferences, consumer demographics, etc. For example, if transaction data includes a consumer charge for a flight to San Diego on Thursday, the banner ad may be personalized to provide a buy one, get one free SeaWorld ticket.

Furthermore, the ad server 140 may dynamically assemble the banner ad. For example, the images, copy, layout, and sequencing of imaging may be personalized to the consumer. The ad server 140 may dynamically assemble the banner ad based on the information available to the ad server 140, such as the information from the data management platform 130, the third-party data source 170, and the web server 160.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

In various embodiments, the system 100 may further comprise a consumer device 180. The consumer device 180 may comprise any device capable of receiving and displaying an electronic message. For example, the consumer device 180 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) tablets, wearables (e.g., smart watches and smart glasses), or any other device capable of receiving data over the network 150. The consumer device 180 may receive offers from the ad server 140 specifically tailored to a consumer based on their consumer information, transaction history, and/or individual transaction records.

The consumer may access a website using the consumer device 180. In various embodiments, the consumer may opt into a program provided by a transaction account provider to provide transaction information to various third parties and to receive targeted banner advertisements.

The information obtained by the advertisement server may be loaded into a frame on the consumer device 180 at the time a website is accessed. Each time the website is subsequently opened, the advertisement server may pull and/or receive current information from the various system participants. Thus, regardless of when the website is accessed by the consumer, the advertisement will be current when the consumer accesses the website.

The network 150 may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Figure 2:
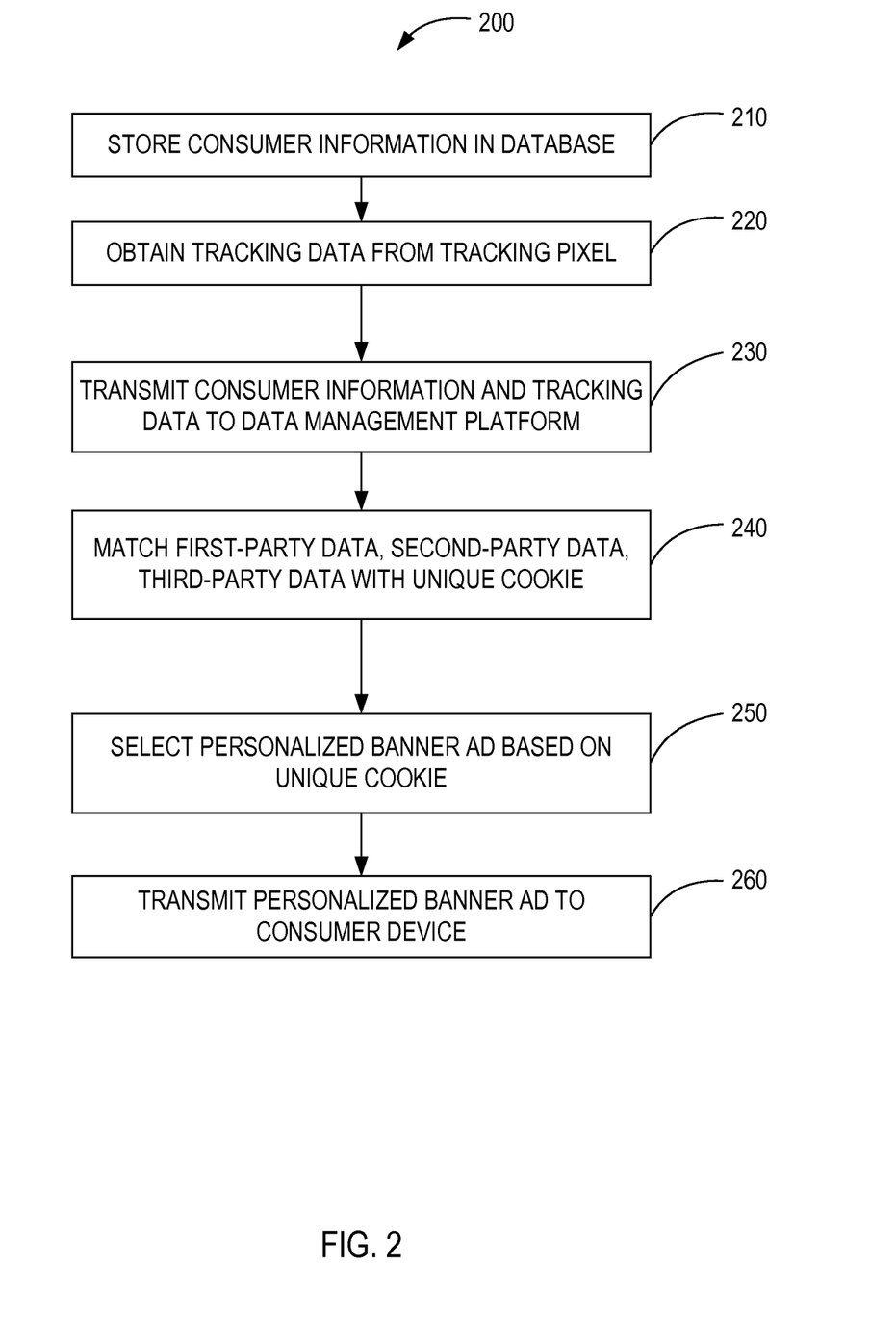
FIG. 2 illustrates a method for delivering personalized banner ads, in accordance with various embodiments.

Referring to FIG. 2, a process 200 for delivering personalized banner advertisements is illustrated according to various embodiments. A transaction account provider may store transaction information and demographic information for a consumer in a database (step 210). In various embodiments, a transaction account provider may obtain the information from a ROC for the transaction. The information may comprise a type of transaction, consumer spend, consumer demographic information, travel information, or any other information related to the consumers. A transaction account provider server may obtain tracking data from a tracking pixel (step 220). The transaction account provider server may transmit the tracking pixel to a consumer device. The tracking data may comprise information regarding a consumer's activities on a transaction account provider website. The transaction account provider may transmit the transaction information, demographic information, and tracking data to a data management platform (step 230). The data management platform may match the transaction information and the demographic information with the tracking data. The combined transaction information, demographic information, and tracking data data may be referred to as first-party data. The data management platform may anonymize the first-party data to remove personally identifiable information and transmit the first-party data to an ad server over a server to server integration.

The transaction account provider may purchase third-party data from a third-party data source. The third-party data source may transmit the third-party data to the ad server.

A web server may collect second-party data from a consumer. The second-party data may comprise information regarding a consumer's activity on a website provided by the web server. The web server may transmit the second-party data to the ad server.

The ad server may match the first-party data, the second-party data, and the third-party data with a unique cookie (step 240). Based on the information in the unique cookie, the ad server may select a personalized banner ad to be displayed to the consumer (step 250). For example, based on the ROC, the ad server may determine that the consumer is travelling to a city on a specific date, based on the second-party data the ad server may determine that the consumer is viewing a website about restaurants, and based on the third-party data the ad server may determine that offers of 20% discounts have a successful conversion rate, and the ad server may match or associate the consumer with offers pertaining to 20% off restaurants in the city on the specific date.

In various embodiments, the merchants may be selected based on additional information specific to the consumer, such as spend capacity. For example, if the consumer has a relatively high spend capacity, the selected merchants may be relatively more expensive merchants. In various embodiments, the ad server may only have access to one or two of the first-party data, the second-party data, or the third-party data. The ad server may select an appropriate ad based on the available data (e.g. first-party data and second-party data; first-party data and third-party data; second-party data and third-party data; first-party data only; second-party data only; or third-party data only).

The ad server may transmit the personalized banner ad to a consumer device (step 260). In various embodiments, the ad server may transmit the personalized banner ad to the web server, and the web server may transmit the personalized banner ad to the consumer device. Thus, while the consumer is browsing on a web site provided by the web server, first-party data from the transaction account provider, second-party data from the web server, and third-party data from a third-party data source may all be utilized to select a banner ad which is specifically tailored to the consumer.

Although described herein with primarily with reference to travel information obtained from transaction account transactions, consumer information may be obtained from a variety of sources, and may be used to provide a variety of information in banner ads which be dynamically selected when a consumer accesses a website or mobile application.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, Xbox®, Sony® PlayStation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, components, modules, and/or engines of system 100 may be implemented as microapplications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "offer" may include any good, service, information, experience, entertainment, data, item, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

A bank may be part of the system, but the bank may represent other types of card issuing institutions, such as credit card companies, card sponsoring companies, or third-party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method comprising:
   transmitting, by a computer-based system, a tracking pixel to a consumer device of a consumer;
   receiving, by the computer-based system, tracking data from the tracking pixel;
   retrieving, by the computer-based system, transaction account data for a plurality of transactions associated with the consumer;
   receiving, by the computer-based system, a record of charge (ROC) associated with a travel transaction, wherein the ROC includes travel data including departure time, departure date, travel destination, return time, return date and return destination;
   obtaining, by the computer-based system, consumer information including consumer demographics, consumer status, consumer spend capability, consumer preferences, conversion rates of offers by the consumer and merchants of interest to the consumer based on the transaction account data;
   obtaining, by the computer-based system using a web cookie, web data including current web browsing data, web browsing history of the consumer, keywords entered by the consumer and tags present in webpages;
   obtaining, by the computer-based system, third party data including keyword targeting, weather data, geographic data, and consumer patterns;
   combining, by the computer-based system, the tracking data, the transaction account data, the consumer information, web data, third party data and ROC data to create combined information;
   creating, by the computer-based system, a cookie based on the combined information;
   determining, by the computer-based system and in response to the consumer accessing a website, advertising content based on the combined information;
   customizing, by the computer-based system and in response to the consumer accessing the website, the advertising content based on the travel data from the ROC to create a custom advertisement; and
   transmitting, by the computer-based system and in response to the consumer accessing the website, the custom advertisement to the consumer device for displaying in a frame on the website.

2. The method of claim 1, further comprising transmitting, by the computer-based system, the combined information to an ad server via a server to server integration and without the use of a pixel.

3. The method of claim 1, wherein the customizing includes determining attractions based on the travel destination and including the attractions in the advertising content.

4. The method of claim 1, wherein the web cookie is on the consumer device.

5. The method of claim 1, further comprising matching, by the computer-based system, the tracking data, the transaction account data, the consumer information, the web data, the third party data and the ROC data.

6. The method of claim 1, wherein the consumer status is based on a type of transaction account of the consumer.

7. The method of claim 1, further comprising obtaining, by the computer-based system and in response to the consumer accessing the website, updates to the tracking data, the transaction account data, the consumer information, the web data, the third party data and the ROC data.

8. An article of manufacture including a non-transitory, tangible computer readable storage medium having instructions stored thereon that, in response to execution by a computer-based system, cause the computer-based system to perform operations comprising:
   transmitting, by the computer-based system, a tracking pixel to a consumer device of a consumer;
   receiving, by the computer-based system, tracking data from the tracking pixel;
   retrieving, by the computer-based system, transaction account data for a plurality of transactions associated with the consumer the transaction;
   receiving, by the computer-based system, a record of charge (ROC) associated with a travel transaction, wherein the ROC includes travel data including departure time, departure date, travel destination, return time, return date and return destination;
   obtaining, by the computer-based system, consumer information including consumer demographics, consumer status, consumer spend capability, consumer preferences, conversion rates of offers by the consumer and merchants of interest to the consumer based on the transaction account data;
   obtaining, by the computer-based system using a web cookie, web data including current web browsing data, web browsing history of the consumer, keywords entered by the consumer and tags present in webpages;
   obtaining, by the computer-based system, third party data including keyword targeting, weather data, geographic data, and consumer patterns;
   combining, by the computer-based system, the tracking data, the transaction account data, the consumer information, web data, third party data and ROC data to create combined information;
   creating, by the computer-based system, a cookie based on the combined information;
   determining, by the computer-based system and in response to the consumer accessing a website, advertising content based on the combined information;
   customizing, by the computer-based system and in response to the consumer accessing the website, the advertising content based on the travel data from the ROC to create a custom advertisement; and
   transmitting, by the computer-based system and in response to the consumer accessing the website, the custom advertisement to the consumer device for displaying in a frame on the website.

9. The article of claim 8, further comprising transmitting, by the computer-based system, the combined information to an ad server via a server to server integration and without the use of a pixel.

10. The article of claim 8, wherein the customizing includes determining attractions based on the travel destination and including the attractions in the advertising content.

11. The article of claim 8, wherein the web cookie is on the consumer device.

12. The article of claim 8, the operations further comprising matching, by the computer-based system, the tracking data, the transaction account data, the consumer information, the web data, the third party data and the ROC data.

13. The article of claim 8, wherein the consumer status is based on a type of transaction account of the consumer.

14. The article of claim 8, further comprising obtaining, by the computer-based system and in response to the consumer accessing the website, updates to the tracking data, the transaction account data, the consumer information, the web data, the third party data and the ROC data.

15. A system comprising:
a processor; and
a tangible, non-transitory memory configured to communicate with the processor,
the tangible, non-transitory memory having instructions stored thereon that, in response to execution by the processor, cause the processor to perform operations comprising:
transmitting, by the processor, a tracking pixel to a consumer device of a consumer;
receiving, by the processor, tracking data from the tracking pixel;
retrieving, by the processor, transaction account data for a plurality of transactions associated with the consumer;
receiving, by the processor, a record of charge (ROC) associated with a travel transaction, wherein the ROC includes travel data including departure time, departure date, travel destination, return time, return date and return destination;
obtaining, by the processor, consumer information including consumer demographics, consumer status, consumer spend capability, consumer preferences, conversion rates of offers by the consumer and merchants of interest to the consumer based on the transaction account data;
obtaining, by the processor using a web cookie, web data including current web browsing data, web browsing history of the consumer, keywords entered by the consumer and tags present in webpages;
obtaining, by the processor, third party data including keyword targeting, weather data, geographic data, and consumer patterns;
combining, by the processor, the tracking data, the transaction account data, the consumer information, web data, third party data and ROC data to create combined information;
creating, by the processor, a cookie based on the combined information;
determining, by the processor and in response to the consumer accessing a web site, advertising content based on the combined information;
customizing, by the processor and in response to the consumer accessing the website, the advertising content based on the travel data from the ROC to create a custom advertisement; and
transmitting, by the processor and in response to the consumer accessing the website, the custom advertisement to the consumer device for displaying in a frame on the website.

16. The system of claim 15, further comprising transmitting, by the processor, the combined information to an ad server via a server to server integration and without the use of a pixel.

17. The system of claim 15, wherein the customizing includes determining attractions based on the travel destination and including the attractions in the advertising content.

18. The system of claim 15, wherein the web cookie is on the consumer device.

19. The system of claim 15, the operations further comprising matching, by the processor, the tracking data, the transaction account data, the consumer information, the web data, the third party data and the ROC data.

20. The system of claim 15, wherein the consumer status is based on a type of transaction account of the consumer.

* * * * *